(12) United States Patent
Manovit et al.

(10) Patent No.: US 7,779,393 B1
(45) Date of Patent: Aug. 17, 2010

(54) SYSTEM AND METHOD FOR EFFICIENT VERIFICATION OF MEMORY CONSISTENCY MODEL COMPLIANCE

(75) Inventors: Chaiyasit Manovit, Mountain View, CA (US); Sudheendra G. Hangal, Bangalore (IN); Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1046 days.

(21) Appl. No.: 11/137,755

(22) Filed: May 25, 2005

(51) Int. Cl.
G06F 9/44 (2006.01)
G06F 12/00 (2006.01)
G06F 9/45 (2006.01)

(52) U.S. Cl. .................. 717/132; 711/141; 711/154; 717/127; 717/131; 717/135; 717/149; 717/156

(58) Field of Classification Search .................. None
See application file for complete search history.

(56) References Cited

U.S. PATENT DOCUMENTS

| 5,692,153 | A * | 11/1997 | Malik et al. | 711/141 |
| 6,892,286 | B2 * | 5/2005 | Hangal et al. | 711/154 |
| 7,024,600 | B2 * | 4/2006 | Manley et al. | 714/712 |
| 7,305,649 | B2 * | 12/2007 | Bellas et al. | 716/17 |
| 7,398,515 | B2 * | 7/2008 | Atoji et al. | 717/126 |
| 2003/0159093 | A1 * | 8/2003 | Manley et al. | 714/712 |
| 2004/0064656 | A1 * | 4/2004 | Hangal et al. | 711/154 |

OTHER PUBLICATIONS

"The Complexity of Sequential Consistency", P.B. Gibbons and E. Korach, Proc. 4th IEEE Symposium on Parallel and Distributed Processing, 1992, pp. 317-325.
A Program to Verify Memory Systems Using the Memory Consistency Model, S. Hangal, D. Vahia, C, Manovit, J. Lu, and S. Narayanan, 31st Annual Internal Symposium on Computer Architecture (ISCA) 2004.
"Verifying Sequential Consistency Using Vector Clocks", Harold W. Cain and Mikko H. Lipasti, Proc. 14th Symposium on Parallel Algorithms and Architectures (SPAA) Revue, Aug. 2002.
"On testing Cache-Coherent Shared Memories", P.B. Gibbons and E. Korach, SPAA 1994, pp. 177-188.

(Continued)

Primary Examiner—Tuan Q Dam
Assistant Examiner—Evral Bodden
(74) Attorney, Agent, or Firm—Meyertons, Hood, Kivlin, Kowert & Goetzel, P.C.

(57) ABSTRACT

A system for efficiently verifying compliance with a memory consistency model includes a test module and an analysis module. The test module may coordinate an execution of a multithreaded test program on a test platform. If the test platform provides an indication of the order in which writes from multiple processing elements are performed at shared memory locations, the analysis module may use a first set of rules to verify that the results of the execution correspond to a valid ordering of events according to a memory consistency model. If the test platform does not provide an indication of write ordering, the analysis module may use a second set of rules to verify compliance with the memory consistency model.

14 Claims, 11 Drawing Sheets

OTHER PUBLICATIONS

"The Complexity of Verifying Memory Coherence", J.F.Cantin, M.H.Lipasti and J.E.Smith, SPAA 2003, pp. 254-255.

"Verification Methods for Weaker Shared Memory Consistency Models", Proceedings of the 15th IPDPS 2000 Workshops on Parallel and Distributed Processing.

"An Executable Specification, Analyzer and Verifier for RMO (Relaxed Memory Order", S. Park, D.L. Dill, SPAA 1995, pp. 34-41.

"The SPARC Architecture Manual, Version 9", SPARC International, Inc., David Weaver and Tom Germond (Editors), 1994, pp. 119-132.

* cited by examiner

Example Total Operation Ordering After Using Heuristic: (S[B]#3,S[A]#1,L[B]#3,S[B]#4,S[A]#2,L[B]#4)

SYSTEM AND METHOD FOR EFFICIENT VERIFICATION OF MEMORY CONSISTENCY MODEL COMPLIANCE

BACKGROUND OF THE INVENTION

1. Field of the Invention

This invention relates to the field of computer systems, and more particularly to verification of compliance with memory consistency models for multiprocessor systems.

2. Description of the Related Art

Shared memory multiprocessor computer system architectures have become a common solution for complex computing needs, such as are often encountered in computer network servers and telecommunications applications. A typical shared memory multiprocessor computing system includes two or more processors that access shared memory. The same physical address on different processors typically refers to the same location in the shared memory. In shared memory architectures, a memory consistency model typically specifies the semantics of memory operations to coordinate accesses by multiple processors to the shared memory. A memory model effectively establishes a contract between the programmer and the hardware. Thus, both programs and hardware in a shared memory multiprocessor system must be correct with respect to the memory model definition for proper operation. Memory models can have a significant impact on ease of programming and optimizations performable by the hardware or the compiler.

One example of a memory consistency model is the Total Store Order ("TSO") memory model developed by Sun Microsystems, Inc. The TSO memory model specification defines the semantics of load, store and atomic memory operations (such as swap operations) in uniprocessor or multiprocessor systems from the point of view of program results. TSO defines two types of orders over the set of memory operations: a per processor program order denoting the sequence in which the processor logically executes instructions, and a global memory order conforming to the order in which operations are performed at the memory.

Memory operations are ordered by six TSO axioms: the Order, Atomicity, Termination, LoadOp, StoreStore and Value axioms. The Order axiom requires that there is a total order over all stores. The Atomicity axiom requires that there be no intervening stores between a load component and a store component of an atomic memory operation such as a swap. The Termination axiom requires that all stores and swaps eventually terminate. That is, if one processor of a multiprocessor does a store to a particular memory location and another processor repeatedly does loads to read the particular memory location, there will eventually be a load that reads the value stored by the first processor. The LoadOp axiom requires that if an operation follows a load in per processor program order, then the operation must also follow the load in global memory order. The StoreStore axiom requires that if two stores appear in a particular order in per processor program order, then they must also appear in the same order in global memory order. Informally, the LoadOp and StoreStore axioms together imply that under TSO, the only kind of reordering allowed between operations on the same processor is for loads to overtake stores, i.e., a load which succeeds a store in program order may precede it in global order. The Value axiom requires that the value returned by a load from a particular memory location is the value written to that memory location by the last store in global memory order, among the set of stores preceding the load in either global memory order or program order. The Value axiom allows a load to read the value written by an earlier store on the same processor, before that store has completed in global order. This permits processor implementations with store buffers, for example, to locally bypass data from a store to a load, before the store is globally visible. In a multiprocessor supporting the TSO memory consistency model, a violation of a TSO axiom by a sequence of memory operations may indicate a design problem or bug.

One difficulty with advanced shared memory multiprocessor architectures is that design problems or bugs are difficult to find, isolate and correct. The memory subsystem is among the most complex parts of modern multiprocessor architectures, especially of architectures employing chip multiprocessing (CMP) or simultaneous multithreading (SMT), and therefore among the most bug-prone. Undetected bugs result in improper operations that often lead to system failures and that delay new design releases or, worse, require post-release patches. It is often difficult to determine the validity of program execution results in the presence of race conditions. Since the results of the program may be timing-dependent, multiple legal outcomes may exist, and a simple architectural model of the multiprocessor may not be sufficient to verify that the results comply with the memory consistency model. Existing techniques to verify program execution results may sometimes require analysis steps with relatively high levels of computational complexity. As a result, cost and time constraints associated with typical processor design cycles may tend to limit the use of the existing techniques to relatively small programs and/or relatively small multiprocessors.

SUMMARY

Various embodiments of a system and method for efficiently verifying compliance with a memory consistency model are disclosed. According to a first embodiment, the system includes a test module and an analysis module. The test module may be operable to coordinate an execution of a multithreaded test program on a test platform that includes multiple processing elements (e.g., multiple processors or multiple processor cores). The test platform may include actual multiprocessor computer system hardware in one embodiment, or a simulation or emulation of a multiprocessor computer system or a memory subsystem in other embodiments. The results of the program execution, which may include per-processing element memory operation sequences, may be provided to the analysis module. If the test platform provides visibility into the order in which writes from multiple processing elements are performed at shared memory locations, the analysis module may use a first set of rules to verify that the results of the execution correspond to a valid ordering of events according to a memory consistency model. For example, if the test platform is a simulation model, a total write order may be provided for each shared memory location written to during the test as part of the simulation results. If, however, the test is run on a test platform that does not provide an indication of write ordering, as may be the case if the test platform is an actual multiprocessor system, the analysis module may use a second set of rules to verify compliance with the memory consistency model. There may be a tradeoff between the level of detail available from the test platform and the efficiency and completeness with which memory consistency model verification can be accomplished. If the test platform provides total write ordering information for each shared memory location, for example, it may, in general, take less time or fewer computational steps to complete the verification analysis than it takes if total write ordering is not available. That is, in one embodiment, the algorithm for applying the first set of rules may be less complex than the algorithm for applying the second set of rules.

In one embodiment, the analysis module may be operable to represent memory operations (e.g., loads and stores) performed during the execution as nodes of a directed graph. Edges between the nodes may be added by the analysis module to represent ordering relationships between the memory operations. A number of different types of edges may be added, corresponding to the axioms of the memory consistency model and the amount of detail (e.g., total write ordering information) provided by the test platform. Some of the edges may be added in iterations, where additional edges may be inferred within each new iteration, based on a traversal of existing edges in a current version of the graph. A cycle in the directed graph may represent a violation of the memory consistency model, as it may represent an order of memory operations that violates the axioms of the model.

According to one embodiment, the analysis module may associate and maintain a vector clock including a plurality of entries with each node of the directed graph. The vector clock entries for a particular node may point to other nodes (corresponding to other processing elements' operations) that occur after the particular node in global memory order. The analysis module may use the vector clock entries to reduce the number of traversals of existing edges that may be needed to determine whether additional edges are to be added to the graph, and may thus enhance the efficiency of memory consistency model verification. The use of vector clocks in this manner may represent a tradeoff between increased memory usage and total time taken for analysis—e.g., by using additional memory to store the vector clock entries for each node, the analysis runtime may be reduced.

According to another embodiment, if the write ordering information is not provided by the test platform, the analysis module may use a heuristic based on possible write orders to verify compliance with the memory consistency model. For example, in one such embodiment, the analysis module may use a topological sort of the current version of the graph at the end of each iteration of adding inferred edges to obtain a possible write ordering for each shared memory location, and then apply the first set of rules to the graph. If the application of the first set of rules results in a determination of a valid total ordering of events, the analysis module may not need to continue with further iterations of adding inferred edges, and may infer that the execution corresponding to the graph complies with the memory consistency model. Thus, for some executions, the use of the heuristic may result in a positive determination of compliance with the memory consistency model, in contrast to other basic analysis techniques that may only indicate whether a violation of the memory consistency model was found or not (and may miss some violations in some cases). The heuristic may allow the analysis module to further improve the efficiency of verifying memory consistency model compliance and also increase the confidence level in the results of the analysis. Both the heuristic and the vector clock technique may be used in some embodiments.

Figure 1:
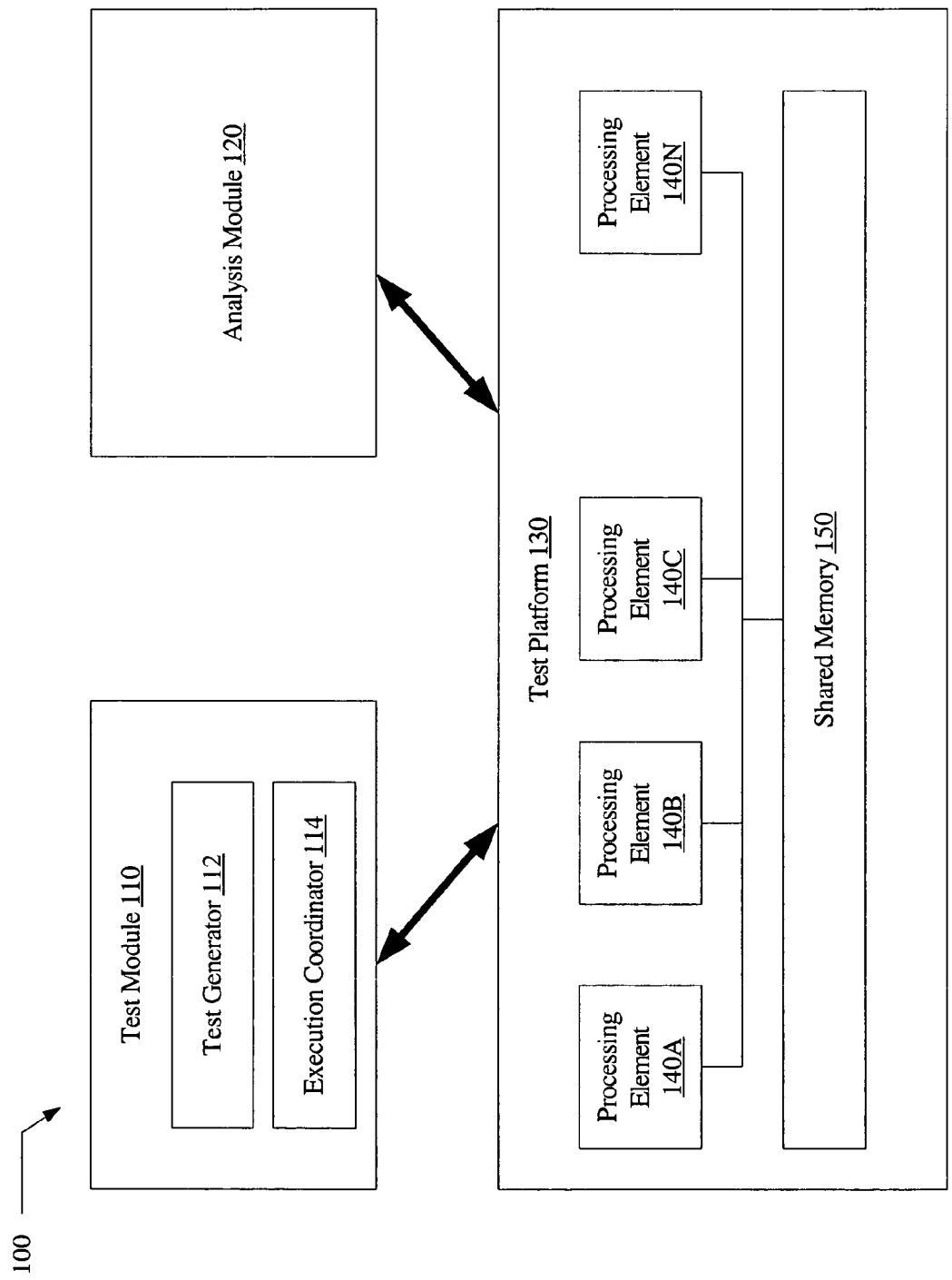
FIG. 1 is a block diagram of a system, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram of one embodiment of a system 100. System 100 includes a test module 110, an analysis module 120 and a test platform 130. Test module 110 and analysis module 120 may be operable to use test platform 130 to test whether a sequence of memory operations performed in a shared memory multiprocessor computer system violate a memory consistency model (e.g., the Total Store Order or TSO memory consistency model from Sun Microsystems Inc.). In the illustrated embodiment, for example, test platform 130 may include a plurality of processing elements 140A-140N (collectively, processing elements 140) and a shared memory 150. In some embodiments, test platform 130 may comprise the actual hardware of a shared memory multiprocessor computer system, where, for example, each processing element 140 is a processor or a processing core on a multi-core processor chip. In other embodiments, test platform 130 may comprise a simulation model, e.g., a simulation model of a memory subsystem, or a simulation model of a shared memory multiprocessor computer system. Test module 110 may be operable to coordinate an execution of a multithreaded test program on test platform 130. Analysis module 120 may be operable to use one or more sets of rules to verify that the results of the execution of the multithreaded test program correspond to a valid order of events according to the memory consistency model. Further details on the design and generation of the multithreaded test program, and the components and functionality of the test module, in various embodiments are provided below.

In some embodiments analysis module 120 may use the rules to develop a graphical representation of the execution of memory operations of the multithreaded test program, and to search for patterns (e.g., cycles in a directed graph) that may indicate a violation of the memory consistency model. In one embodiment, the specific rules used by analysis module 120 to verify compliance with the memory consistency model may vary as a function of the level of detail provided by test platform 130 about the relative sequence of memory operations performed during the test program execution. For example, in some cases, such as when a simulation model is used as the test platform 130, a total ordering of write operations to each memory location written to during the test program may be provided as part of the simulation results. In some embodiments, analysis module 120 may use a first set of rules where such a total ordering is provided, and may use a different set of rules if the total ordering is not provided (e.g., if the test is run on an actual implementation of a multiprocessor system where it may not be possible to capture write order for each memory location modified during the test, or where the test execution may be perturbed to an unacceptable degree if write ordering information is gathered for each memory location). The rules used for analysis when a total ordering of writes is available may result in a more efficient and/or a more complete verification of compliance with the memory consistency model than the rules used when total write ordering information for each memory location is not available. In addition, in some embodiments, analysis module 120 may also be operable to use one or more optimizations, such as a vector clock technique or a heuristic based on possible write ordering sequences, to reduce the time taken to complete memory consistency model verification. Further details of the different types of rules that may be used by analysis module 120, as well as the optimizations performed in different embodiments, are provided below.

As noted above, in some embodiments test platform 130 may include an actual multiprocessor computer system, which may for example run an operating system in addition to the multithreaded test program. The execution of operating system operations (and/or the presence of other external perturbations) in conjunction with the test program may affect the results of the test program in some embodiments—for example, memory-related operating system activities may affect the timing of memory operations performed during the test. As a result, in such embodiments the results of the memory model compliance analysis performed by analysis module 120 may be applied only to specific test runs (i.e., the analysis results may change if the test is repeated). Multiple test and analysis runs or repetitions may therefore be performed in such embodiments. In other embodiments, test platform 130 may include simulation models at any desired level of abstraction, such as architectural models, RTL (Register Transfer Level) models, or gate-level models. The simulation may encompass only the units of a memory subsystem in some embodiments, e.g., the model may include only shared memory 150 and its interactions with processing elements 140, or may include additional elements of the multiprocessor computer system. Any desired combination of software simulators, hardware accelerators or FPGA (Field Programmable Gate Array) based emulators may be used in test platform 130 in different embodiments.

Figure 2:
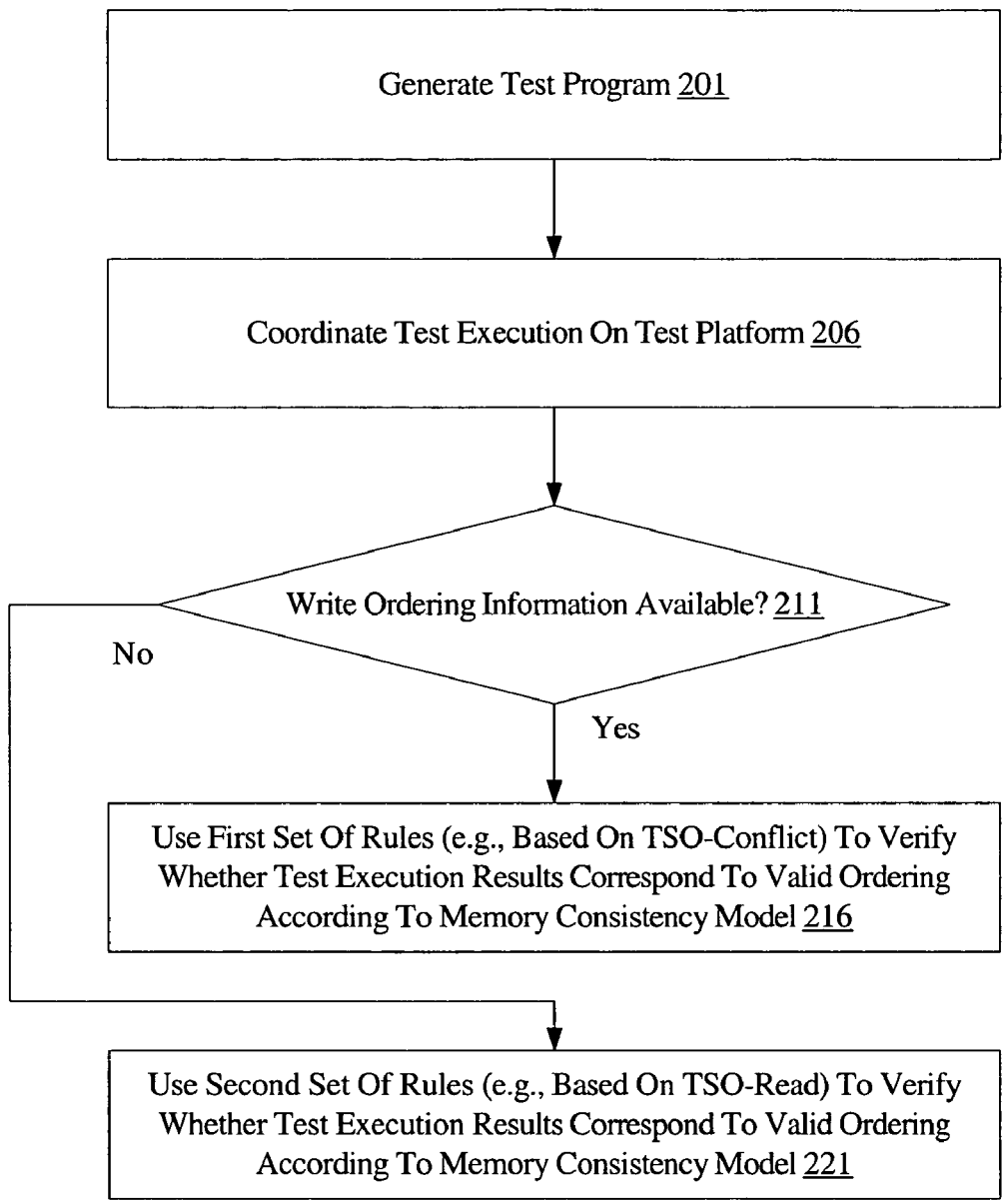
FIG. 2 is a flow diagram illustrating aspects of the operation of a test module and an analysis module, according to one embodiment.

FIG. 2 is a flow diagram illustrating aspects of the operation of test module 110 and analysis module 120, according to one embodiment. As shown in blocks 201 and 206 of FIG. 2, test module 110 may be configured to generate the multithreaded test program and to coordinate the execution of the test program on the test platform 130. In one embodiment, as illustrated in FIG. 1, test module 110 may comprise a test generator 112 and an execution coordinator 114. Test generator 112 may be configured to generate the multithreaded test program to be executed on test platform 130, while execution coordinator 114 may be responsible for managing the execution itself—e.g., for starting and stopping the execution, obtaining intermediate and final results, etc. Further details about the functionality of test generator 112 and execution coordinator 114 are provided below.

The results of the execution of the test program may be provided to analysis module 120. In one embodiment, if write ordering information (e.g., a total ordering of writes at each memory location written to during the test program) is available (as detected in decision block 211 of FIG. 2), analysis module 120 may use a first set of rules to verify whether the execution results correspond to a valid ordering of events according to a specified memory consistency model (block 216). If the write ordering information is not available, analysis module may use a second set of rules to verify whether the execution results conform to the memory consistency model (block 221). The techniques illustrated in FIG. 2 may be used to verify compliance with a number of different memory consistency models in different embodiments. As described below in further detail, if the memory consistency model is the TSO model, the rules used by analysis module may be derived from a problem termed "TSO-conflict" if write ordering information is available, and may be derived from a problem termed "TSO-read" if write ordering information is not available. As noted above, in some embodiments analysis module 120 may use graphical techniques to verify memory consistency model compliance, e.g., by attempting to detect cycles in a directed graph representing the ordering of memory operations.

The multithreaded test program used by test module 110 may be generated in accordance with a set of user-specified preferences in some embodiments. Test generator 112 may provide an interface (e.g., input parameter files or a graphical user interface) allowing a user to specify parameters such as relative frequency of instruction types, memory layout details and loop characteristics. Based on such parameters, the test program may include a pseudo-random or random sequence of instructions likely to result in data races, for example including frequent memory accesses to shared memory locations from different processing elements 140. In one embodiment test generator 112 may first generate an internal representation of the multithreaded test program, each thread represented by a sequence of nodes corresponding to operations performed in that thread. The internal representation may then be mapped by test generator 112 into a set of assembler instructions or to a set of instructions in some other language suitable for the test platform 130 (e.g., simulation control instructions). In one embodiment, test generator 112 may be configured to implement "unique store values" (USV)—i.e., to ensure that every write or store operation in the test program writes a distinctly identifiable value. Such unique store values may allow the analysis module 120 to map each load operation back to the store operation that generated the loaded data. To ensure that store values are unique, test generator 112 may, for example, maintain one or more running counters (e.g., an integer counter and a floating point counter for integer and floating point operations respectively) whose values may used for the store values and incremented after each use. In some embodiments, where for example test platform 130 does not automatically save the results of reads or load operations, the test program generated by test generator 112 may also include code to observe and save the results of load operations. The load results may be buffered (e.g., in processor registers) and flushed to memory when the buffers become full, thus reducing perturbation during testing.

In addition to loads and stores with standard operand sizes (e.g., 32, 64 or 128 bits, depending on the processor architecture), in some embodiments test generator 112 may include a variety of other operations in the test program. For example, in one embodiment, memory barrier instructions which may require all previous instructions on the issuing processor or processing element 140 be globally visible before the next instruction is issued may be included. In addition, in other embodiments, instructions to access address space identifiers, various types of prefetch operations, block loads or stores (which may, for example, read or write 64 bytes at a time), cache flush or pipeline flush instructions, compare and swap (CAS) instructions, non-faulting loads, unpredictable conditional branches, inter-processor interrupts or sequences of operations that may cause cache line replacements and/or writebacks may be included. As noted earlier, in some embodiments, users may specify the desired mix of different types of instructions to be included in the test program, e.g., by specifying the total number of operations and the percentage of each type of operation. In one embodiment, users may also specify desired sequences of particular instructions for inclusion in the test program, for example to exercise known or expected "corner cases" in the design, or lead to situations that are more likely to stress the memory subsystem's ability to conform to the memory consistency model.

In one embodiment, execution coordinator 114 may be configured to initialize the test platform 130 (i.e., detect the number of processing elements 140 and/or bring the test platform to a desired initial state), to initiate the execution of the multithreaded test program, and to gather the results of the execution. The results may include, for example, values read and written for different load/store operations executed by the processing elements 140, and the per-processing element program order (i.e., the sequence of operations at each processing element). For certain test platforms, execution coordinator 114 may also be configured to disable or enable optional features supported by the test platform, e.g., in order to improve test execution performance. In an embodiment employing a simulation model as the test platform, for example, execution coordinator 114 may disable optional runtime detection of failures in order to increase simulation throughput. In some embodiments, execution coordinator 114 may be operable to store the results of the execution of the multithreaded test program in a variety of different formats, including a format suitable for consumption of the results by analysis module 120 (e.g., in a persistent file or via a pointer to a shared area of volatile memory) and a human-readable format. Input parameters may be used to specify a desired output format for the results in some embodiments. Execution coordinator 114 may also be configured to save a representation of the results in a results database in some implementation, so that, for example, differences in results for different test runs may be obtained easily during post-processing.

Analysis module 120 may be operable to verify whether results of the test program execution, obtained for example from execution coordinator 114, correspond to a valid ordering of events according to the memory consistency model. It is noted that while in the following description, the TSO memory consistency model is used as an example, analysis module 120 may be capable of verifying more than one memory consistency model in some embodiments. In such embodiments where multiple memory consistency models may be verified, an identification of the specific memory consistency model to be verified (and/or an identification of the rules corresponding to the specific memory consistency model to be verified) may be provided to analysis module 120, e.g., via an input parameter.

In one embodiment, analysis module 120 may be operable to represent memory operations performed during the execution of the test program as the nodes of a directed graph, and to add edges to the directed graph representing ordering relationships between the memory operations. In such an embodiment, analysis module 120 may be configured to detect that the results of the execution violate the memory consistency model if a cycle is found in the directed graph—that is, the presence of a cycle may indicate a violation of the memory consistency model. As described below in further detail, in some embodiments, analysis module 120 may add edges to the directed graph 120 in a number of steps, some of which may include iterative traversals of the directed graph. Analysis module 120 may use different sets of rules to generate the edges, depending on the specific memory consistency model being verified and on the type of additional information (e.g., total ordering of writes and/or mappings from each load to a store that generated the value read by the load) provided by the test platform 130. It is noted that while a detection of a cycle in the graph may indicate a violation of the memory consistency model, in some embodiments and for certain kinds of test platforms (e.g., platforms that do not provide total write ordering information), the fact that the analysis does not detect a cycle in the graph may not imply that the results of the execution necessarily comply with the memory consistency model. That is, as explained in further detail below with the help of the example of FIG. 5a, the basic technique of adding edges and detecting cycles described above may not be complete in such embodiments, in that certain types of ordering relationships and/or violations may sometimes be missed. Analysis module 120 may utilize one or more heuristics to improve the confidence level in the result of the analysis, and/or the efficiency of the analysis, in such embodiments.

In order for a test execution result to comply with a memory consistency model, the sequence of memory operations as represented by the results must satisfy the axioms of the memory consistency model. The rules used by analysis module 120 to perform the graphical analysis as described above may therefore be derived, at least in part, from the axioms of the memory consistency model being verified in some embodiments. As noted above, the functionality of analysis module 120 is described herein using TSO as an exemplary memory consistency model according to one embodiment, although analysis module 120 may also be operable to verify compliance with a variety of other memory consistency models (e.g., Sequential Consistency (SC) or Relaxed Memory Order (RMO)) in other embodiments.

As described earlier, the TSO memory consistency model includes six axioms: the Order, Atomicity, Termination, LoadOp, StoreStore and Value axioms. The Order axiom requires that there is a total order over all stores. The Atomicity axiom requires that there be no intervening stores between a load component and a store component of an atomic memory operation such as a swap. The Termination axiom requires that all stores and swaps eventually terminate. That is, if one processor of a multiprocessor does a store to a particular memory location and another processor repeatedly does loads to read the particular memory location, there will eventually be a load that reads the value stored by the first processor. The LoadOp axiom requires that if an operation follows a load in per processor program order, then the operation must also follow the load in global memory order. The StoreStore axiom requires that if two stores appear in a particular order in per processor program order, then they must also appear in the same order in global memory order. Informally, the LoadOp and StoreStore axioms together imply that under TSO, the only kind of reordering allowed between operations on the same processor is for loads to overtake stores, i.e., a load which succeeds a store in program order may precede it in global order. The Value axiom requires that the value returned by a load from a particular memory location is the value written to that memory location by the last store in global memory order, among the set of stores preceding the load in either global memory order or program order. The Value axiom allows a load to read the value written by an earlier store on the same processor, before that store has completed in global order. This permits processor implementations with store buffers, for example, to locally bypass data from a store to a load, before the store is globally visible. In addition, for multiprocessor systems that implement memory barrier operations, a MemBar axiom may be included in TSO, which requires that if, in program order, a load or store "A" precedes a load or store "B" and if a memory barrier operation occurs between "A" and "B", then "A" must precede "B" in global memory order.

In general, the problem of verifying compliance with TSO (which may be termed the VTSO or "Verifying TSO" problem) may be stated as follows. If the memory operation sequences for each thread of a multithreaded program (such as a test program generated by test generator 112) are known, along with the memory location and the written value for each operation with store semantics, and the memory location and the read value for each operation with load semantics, are all the TSO axioms satisfied? (It is noted that since the Termination axiom does not specify a bound on how long it takes for a written value to be seen by other processors, and thus cannot be completely checked using finite test cases, the Termination axiom may be omitted from consideration in the design of practical testing methods for VTSO. Further discussion of the Termination axiom is therefore omitted from the following description.)

In one embodiment, analysis module 120 may be operable to use at least one of two sets of rules, derived respectively from two sub-problems of VTSO known as "VTSO-read" and "VTSO-conflict", in performing the graphical analysis described above. The VTSO-read problem is the VTSO problem with additional information mapping each read operation to the corresponding write operation that generated the read value. A VTSO problem where all written values are unique (e.g., as a result of the Unique Store Values technique used by test generator 112 in generating the multi-threaded test program described above) becomes, in effect, a VTSO-read problem. The VTSO-conflict problem is the VTSO-read problem with additional information specifying the total order of write operations to each memory location. The VTSO-read and VTSO-conflict problems may each be considered to represent scenarios or test execution results where the test platform provides specific details about memory operations that may be used to simplify the verification of compliance with TSO axioms. Since VTSO-conflict provides an additional level of detail (total write ordering) beyond the level of detail provided in VTSO-read, VTSO-conflict in turn represents a problem that in general may have a lower computational complexity than VTSO-read.

In embodiments where the Unique Store Values technique is used in generating the multithreaded test program, each test run may represent an instance of the VTSO-read problem. In embodiments where total write ordering information for each memory location is additionally available, a test run may also represent an instance of the VTSO-conflict problem. In adding edges to the directed graph representation of the memory operations, analysis module 120 may be configured to use a first set of rules if the test run represents an instance of the VTSO-conflict problem, and a second set of rules for if the test run represents an instance of the VTSO-read problem, but does not also represent the VTSO-conflict problem. The edges added by analysis module 120 may represent global ordering information derived from the operation sequences for each processing element and the additional information (e.g., mapping from loads to corresponding stores and/or total write ordering) provided in the test results.

In one embodiment, the rules for adding edges for VTSO-conflict may include rules for adding static edges, observed edges and value ordering edges. Static edges may be generated independent of the values that may be read or written in load and store operations. Observed edges may be generated based on load results, and value ordering edges may be added based on total write ordering. In such an embodiment, the rules may be summarized as described below. In the summarization of the rules, "L" represents a load, "S" represents a store, "Op" represents either a load or store, "M" represents a memory barrier operation, ".pro." represents per processing element program order, and ".glo." represents global memory order. Each implication of an ordering relationship derived from the rules may result in the addition of a corresponding edge to the graph. Other memory operations may be mapped to loads and stores in a preliminary step before the rules are applied—for example, a swap operation may be represented as a load and a store. In addition, a single synthetic node, logically equivalent to a set of stores, may be added at the root of the graph to initialize memory locations accessed during the test.

Static Edges:

Rule A1: L.pro.Op implies L.glo.Op (derived from the LoadOp Axiom)

Rule A2: S.pro.S' implies S.glo.S' (derived from the Store-Store Axiom)

Rule A3: S.pro.M.pro.L implies S.glo.L (derived from the Membar Axiom)

For the remaining rules, S, S' and L represent accesses to the same memory location, where S writes the value read by L, and S' writes a different value.

Observed Edges:

Rule A4: If S does not precede L in per processing element program order, this implies S.glo.L (derived from Value axiom, which requires that the load must read the value last written in global memory order, so if S does not precede L on the local processor, it must precede L in global memory order)

Rule A5: S'.pro.L implies S'.glo.S (also derived from the Value axiom. If S' precedes L on the local processor, but L reads the value written by S, then S' must precede S in global memory order.)

Value Ordering Edges:

Rule A6: S.glo.S' (according to the total write order for the memory location written by S and S')

Rule A7: S.glo.S' implies L.glo.S' for all L reading the value written by S (derived from the Value axiom. This rule enforces the Value axiom by ensuring that S must be the most recent store in global order for L because every store ordered after S will also be ordered after L. Only the S' that immediately follows S in the total write ordering for that location need be considered in applying this rule)

The rules used for VTSO-read may also include the rules for adding static edges and observed edges, as described in Rules A1-A5 above, in one embodiment. However, as total write ordering information may not be available in VTSO-read, rules A6 and A7 may be replaced by rules B6 and B7 for adding inferred edges in some embodiments.

Inferred Edges:

Rule B6: S'.glo.L implies S'.glo.S (derived from the Value axiom. Assuming the opposite implication, S.glo.S', leads to a contradiction because L cannot read the value written by S, since that value would have been overwritten by S')

Rule B7: S.glo.S' implies L.glo.S' (also derived from the Value axiom. This rule is similar to rule A7, except that, since total write ordering information is not available in VTSO-read, the S' that immediately follows S in the per-location total order may not be known, and so rule B7 must be applied for every applicable S'.)

The inferred edges corresponding to rules B6 and B7 may be added in multiple iterations in some embodiments, as indicated in the following high-level description and pseudo-code. The function w(L) in the pseudo-code identifies the store operation that wrote the value read by the load L.

//Input: A per-processing element memory operation sequence and a
//function w that maps a load to the store which created its value
//First, add static and observed edges (Rules A1-A5)
//Then, add inferred edges iteratively (Rules B6-B7)
do
   for each load L
   S=w(L); //find the store that wrote the value read by L
     recursively trace all store predecessors S' of L:
     if (S' !=S) and (S and S' write to the same address)
       then add edge from S' to S;
     end if;
   end for;
   for each store S
   recursively trace all store successors S' of S:
     if (S' and S write to the same address)
       then add edge from L to S' for all loads L reading value written by S;
     end if;
   end for;
until no more edges can be added The first for loop in the pseudo-code corresponds to an application of rule B6, while the second corresponds to an application of rule B7. To apply rule B6, the directed graph may be traversed backwards from L to find all its currently-known store predecessors in global order. To apply rule B7, the directed graph may be traversed forwards from S to find currently-known successors of S in global order. Since the global order may still be still in the process of being derived when the traversals occur, rules B6 and B7 may be applied iteratively to the directed graph until a fixed point is reached and no additional edges are added in a complete iteration. It is noted that the complexity of the graphical analysis algorithm for VTSO-read may be shown to be polynomial in terms of the number of nodes in the directed graph, while the algorithm described earlier for VTSO-conflict may be shown to be linear in terms of the number of nodes. An example of the application of the rules for VTSO-read is provided below, in conjunction with the description of FIG. 4.

Figure 3:
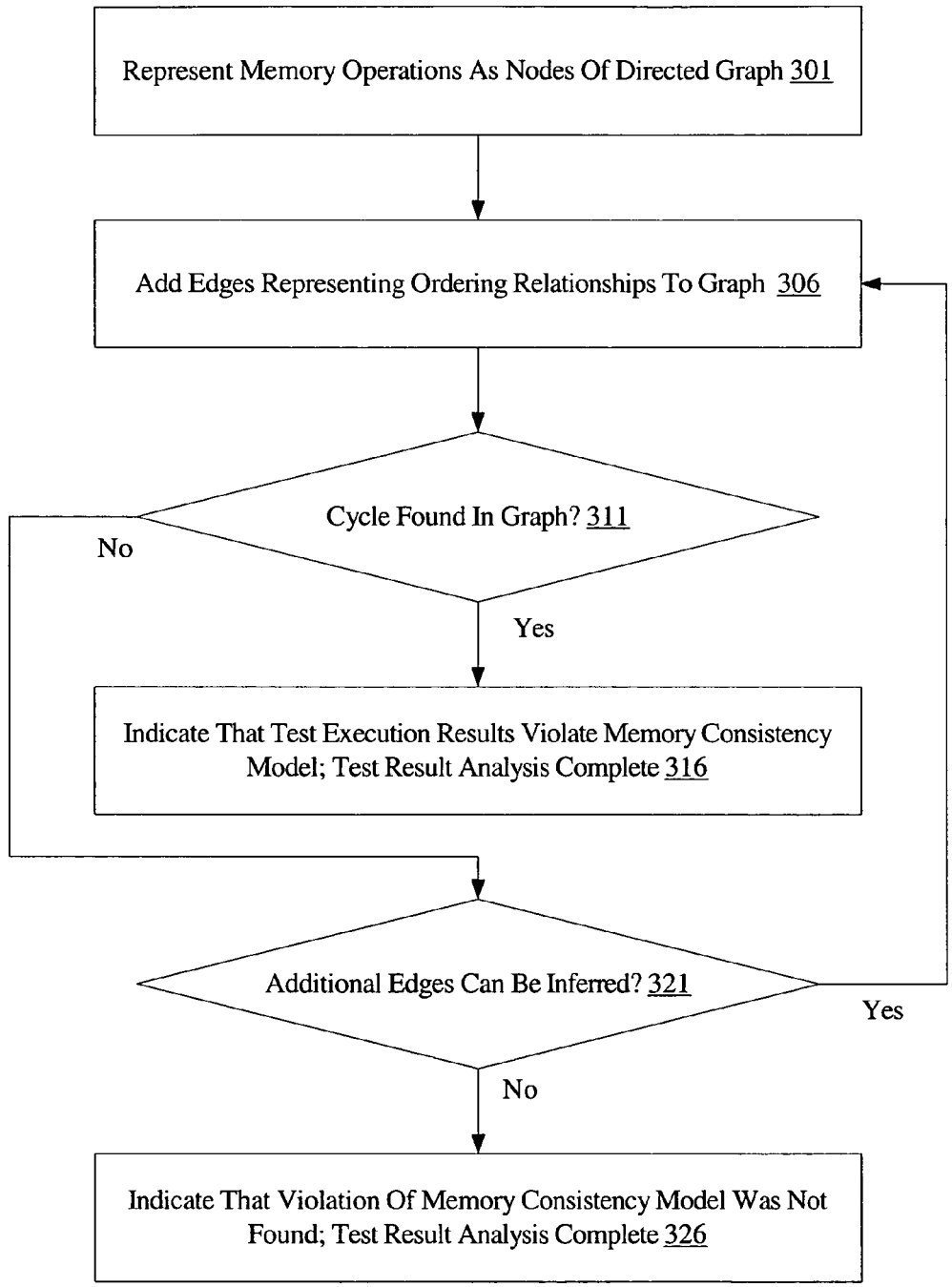
FIG. 3 is a flow diagram illustrating further aspects of the operation of analysis module, according to one embodiment.

FIG. 3 is a flow diagram illustrating further aspects of the operation of analysis module 120 according to one embodiment. As described above, analysis module 120 may be configured to represent memory operations performed during the test execution as nodes of a directed graph (block 301), and add edges representing ordering relationships between the memory operations to the graph (block 306). For example, in one embodiment, edges corresponding to the application of rules A1-A5 and to a first iteration of an application of rules B6-B7 may be added in operations corresponding to block 306 during an initial pass through block 306. If a cycle is detected in the graph at this point (decision block 311), analysis module 120 may indicate that the test results violate the memory consistency model (block 316) and terminate the analysis. If no cycle is detected, and additional edges for the graph can be inferred (as detected in decision block 321), such additional edges may be added in a repeat pass through block 306. In one embodiment, iterations through blocks 306, 311 and 321 of FIG. 3 may correspond to the pseudo-code provided above that represents iterations of application of rules B6 and B7. If no additional edges can be inferred, and no cycles have been found, analysis module 120 may indicate that a violation of the memory consistency model was not found (block 326) and may terminate the analysis.

It is noted that, in embodiments where the test results represent a TSO-read problem (and not a TSO-conflict problem because total write ordering information is not available), while the analysis performed by analysis module 120 may detect violations of the TSO axioms if cycles are found, the basic graphical technique as described above may be incomplete. That is, in the absence of cycles, while a global order that is consistent with the LoadOp, StoreStore, Membar, Value and Atomicity axioms may be obtained from the graph at the end of the analysis, the analysis does not ensure that Order axiom is satisfied. In order to satisfy the Order axiom, the analysis module would have to identify unordered writes at the end of the algorithm and search for a combination of relations between the unordered writes that is compatible with the results. Such a search may make the analysis runtime exponential with respect to the number of nodes in the graph in the worst case, which may make the analysis impractical. By not explicitly enforcing the Order axiom, the analysis module 120 may thus trade off accuracy for reasonable analysis time. As described below, in some embodiments a heuristic based on possible write orders may be employed by analysis module 120 to increase the probability of determining compliance with the Order axiom, and to potentially reduce the number of iterations of applications of rules B6 and B7.

Figure 4:
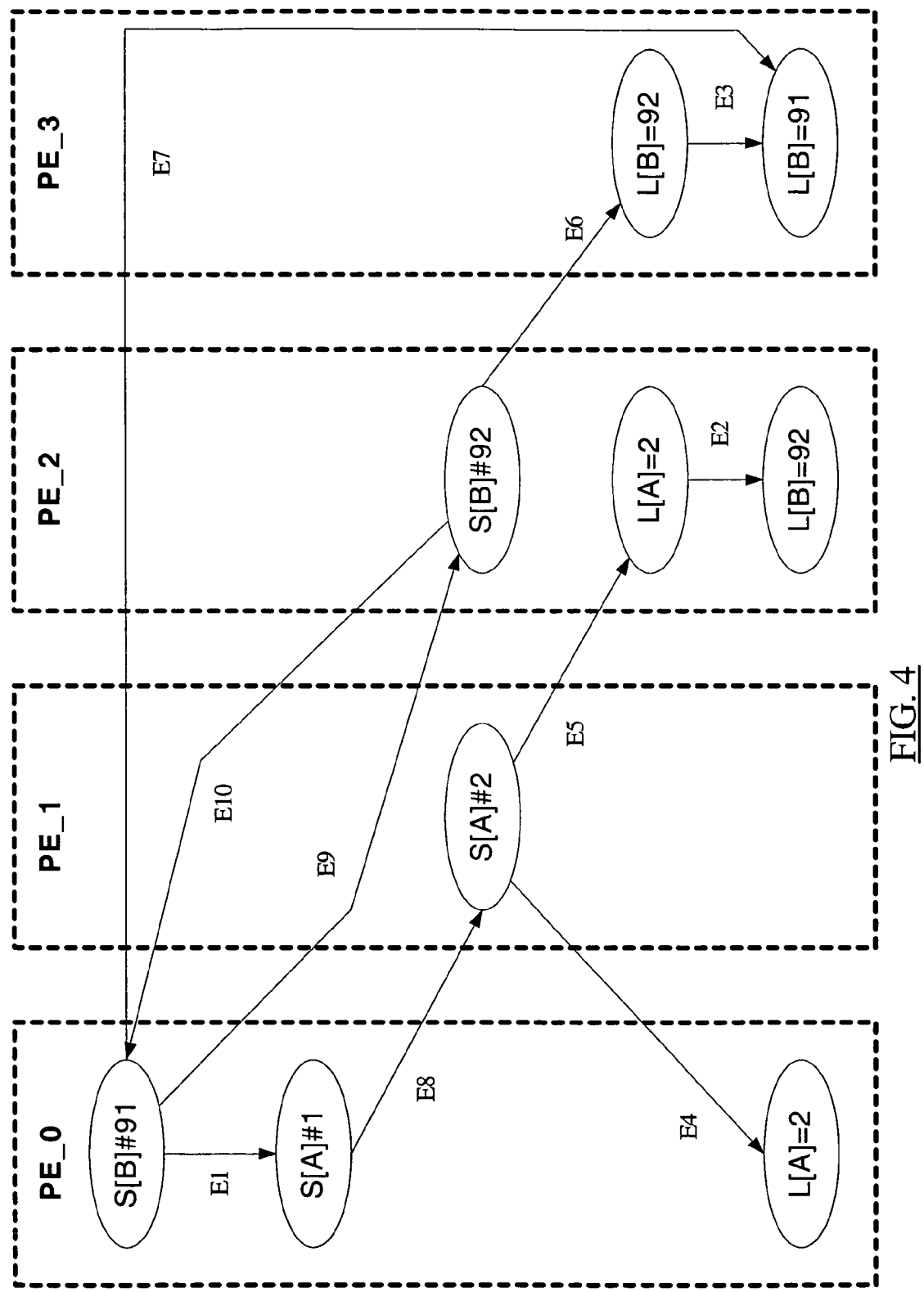
FIG. 4 illustrates an example of a directed graph representation of memory operations generated by an analysis module, according to one embodiment.

FIG. 4 illustrates an example of a directed graph representation of memory operations generated by analysis module 120 for an execution of a multi-threaded test program representing a VTSO-read problem, according to one embodiment. In FIG. 4, the notation "S[A]#M" refers to a store which writes the value M to memory location A, and the notation "L[B]=N" refers to a load that reads the value N from memory location B. The per-processing element program order is shown in four columns in FIG. 4, each column corresponding to one of four processing elements PE_0, PE_1, PE_2, and PE_3. The events in each column are sequenced from the top of the column to the bottom of the column in program order. For example, the program order for processing element PE_1 is "S[B]#91", followed by "S[A]#1", followed by "L[A]=2".

In generating the graph illustrated in FIG. 4, analysis module 120 may first add edges E1, E2 and E3, corresponding to rules A1 and A2 described above, in accordance with the LoadOp and StoreStore axioms. Next, observed edges E4, E5, E6 and E7 may be added by applying rule A4. The application of rule A5 to "L[A]=2" on PE_0 may then result in the addition of observed edge E8. During the application of rule B6 for the load "L[B]=92" on PE_2, "S[B]#91" on PE_0 may be detected as a predecessor, leading to the addition of inferred edge E9. Finally, tracing the predecessors of "L[B]=91" on PE_3 according to rule B6, analysis module 120 may detect "S[B]#92", leading to the addition of inferred edge E10. At this point, analysis module 120 may detect the cycle formed by edges E9 and E10, indicating a TSO violation: i.e., a conflicting order between "S[B]#91" and "S[B]#92". As described in conjunction with the description of FIG. 3 above, analysis module 120 may then indicate that TSO has been violated and terminate analysis.

Figure 5A:
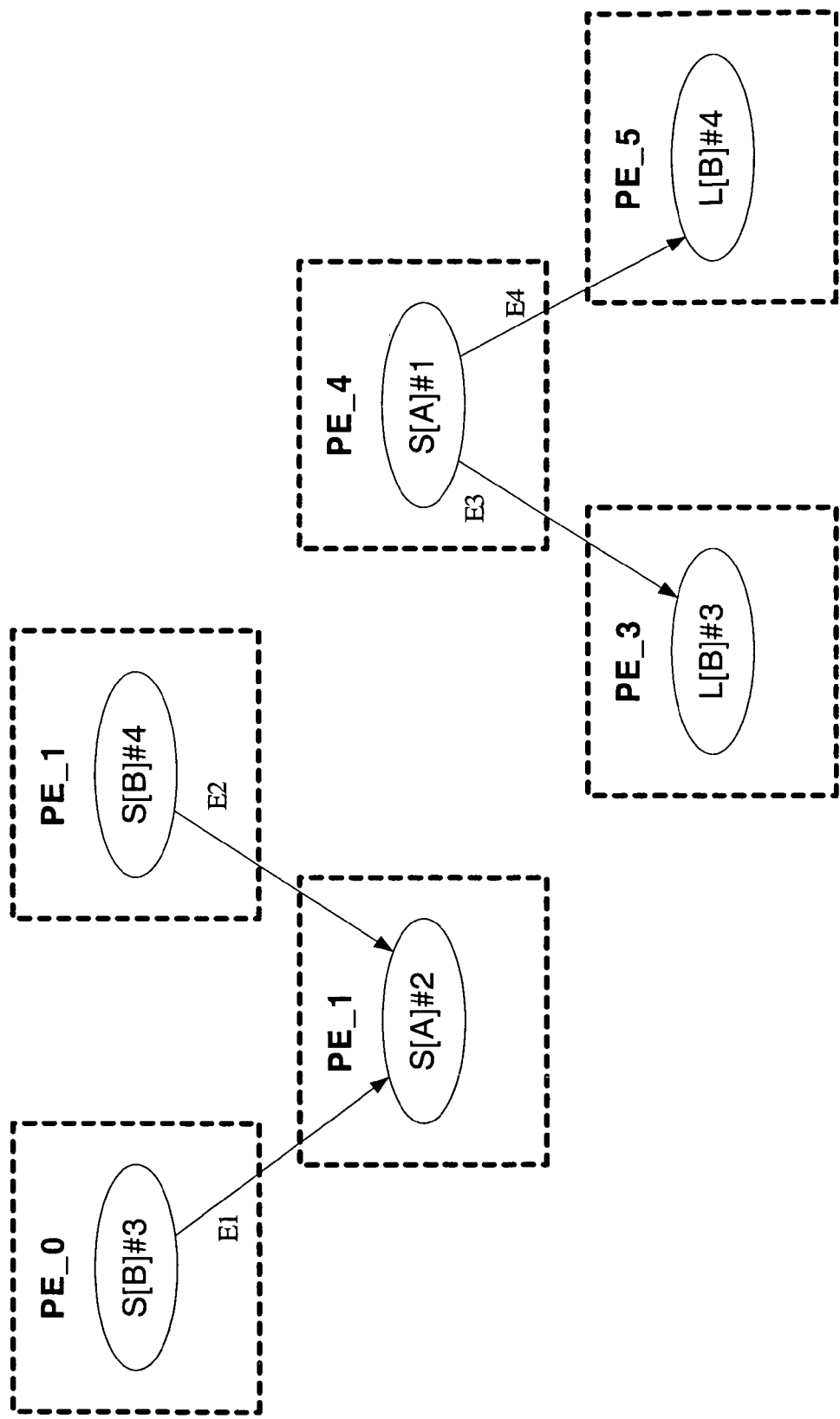
FIG. 5a illustrates another example of a directed graph representation of memory operations generated by an analysis module, according to one embodiment.

As noted above, the graphical analysis technique illustrated in FIG. 3 and FIG. 4 may be incomplete in that it may not verify compliance with the Order axiom in one embodiment. FIG. 5a illustrates an example of a directed graph representation of memory operations generated by analysis module 120 for an execution of another multi-threaded test program representing a VTSO-read problem, according to one embodiment. Memory operations for six processing elements, PE_0 through PE_5, are shown in FIG. 5a, using the same notation as used in FIG. 4. In the example shown in FIG. 5a, analysis module 120 has reached a fixed point at which no new edges can be inferred (i.e., no further iterations of application of rules B6 and B7 are performed). The analysis module 120 has not detected any cycles, and "S[A}#1" and "S[A]#2" have been left unordered. However, "S[A]#1" must precede "S[A]#2" in the illustrated memory operations. Otherwise, "S[A]#2" must precede "S[A]#1" by the Order axiom, but given this order, only one of the two values "3" or "4" may be read by the two loads to location B that are ordered after "S[A]#2". While the example illustrated in FIG. 5a does not represent a TSO violation missed by analysis module 120, adding a similar, mirrored set of nodes to a different location C (e.g., two stores to C ordered before "S[A]#1" and two loads to C ordered after "S[A]#2") may create an instance of a TSO violation that may be missed by the algorithm for TSO-read as described above.

To increase the probability of finding a total valid order and thereby removing the source of incompleteness, in one embodiment analysis module 120 may be configured to adopt the following heuristic. After each complete iteration of applying rules B6 and B7 to all the nodes in the directed graph, analysis module 120 may perform a topological sort on the graph nodes and extract the resulting write order per location. Since the topological sort provides a possible total write order, the algorithm for VTSO-conflict (i.e., the application of rules A1-A7) may then be applied. If no cycles are found after the VTSO-conflict analysis based on the possible total write order, a total operation order valid under TSO may be derived from the graph (e.g., by another topological sort). The analysis module 120 may therefore indicate that the program execution results are valid under the TSO axioms and terminate analysis. In addition to potentially providing such a positive determination of compliance with respect to TSO for some execution results, the application of such a heuristic may thus also reduce the number of iterations for rules B6 and B7 that may otherwise be applied. In contrast to the possible positive determination of compliance with TSO that may be provided using the heuristic, the more basic analysis described above (i.e., the application of rules A1-A5 and B6-B7 without the heuristic) may only indicate whether a violation of TSO was found or not, and may miss some violations of TSO for some executions. If the heuristic does not succeed in providing a valid total operating order (e.g., if a cycle is detected using the VTSO-conflict rules), however, analysis module 120 may not be able to detect that a TSO violation has occurred (since the heuristic was based on a possible write order derived from the topological sort, rather than on a known write order). If no valid total operating order is found, therefore, in one embodiment analysis module may continue further iterations of applying rules B6 and B7, which may in turn result in further applications of the heuristic.

Figure 5B:
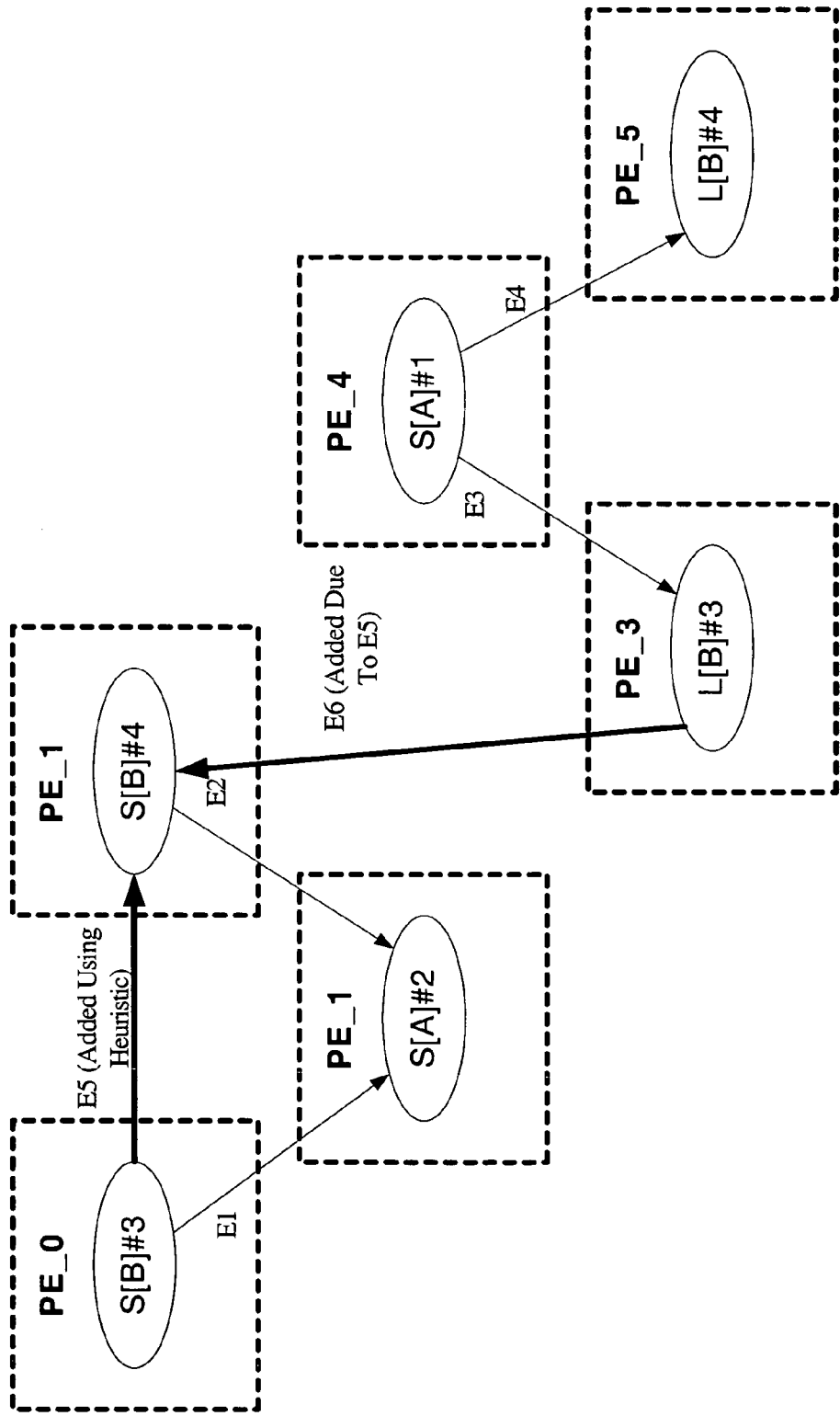
FIG. 5b illustrates an example of an application of a heuristic by an analysis module to the directed graph representation shown in FIG. 5a, according to one embodiment.

FIG. 5b illustrates an example of an application of the heuristic described above to the directed graph representation shown in FIG. 5a, according to one embodiment. In the illustrated example, the topological sort performed by analysis module 120 has resulted in ordering "S[B]#3" before "S[B]#4", as indicated by edge E5. That is, edge E5 has been added to the graph by analysis module 120 to represent a possible write order in which "S[B]#3" precedes "S[B]#4". After analysis module 120 has added edge E5, the application of rule A7 may result in the further addition of edge E6. At this point, the order between "S[A]#1" and "S[A]#2" is also established, no cycle has been detected, and analysis module 120 may determine a valid total ordering that complies with the TSO axioms and terminate analysis. For example, as shown in FIG. 5b, a valid total operation ordering such as ("S[B]#3", "S[A]#1", "L[B]#3", "S[B]#4", "S[A]#2", "L[B]#4") may be determined by analysis module 120, e.g., using a topological sort.

Figure 6:
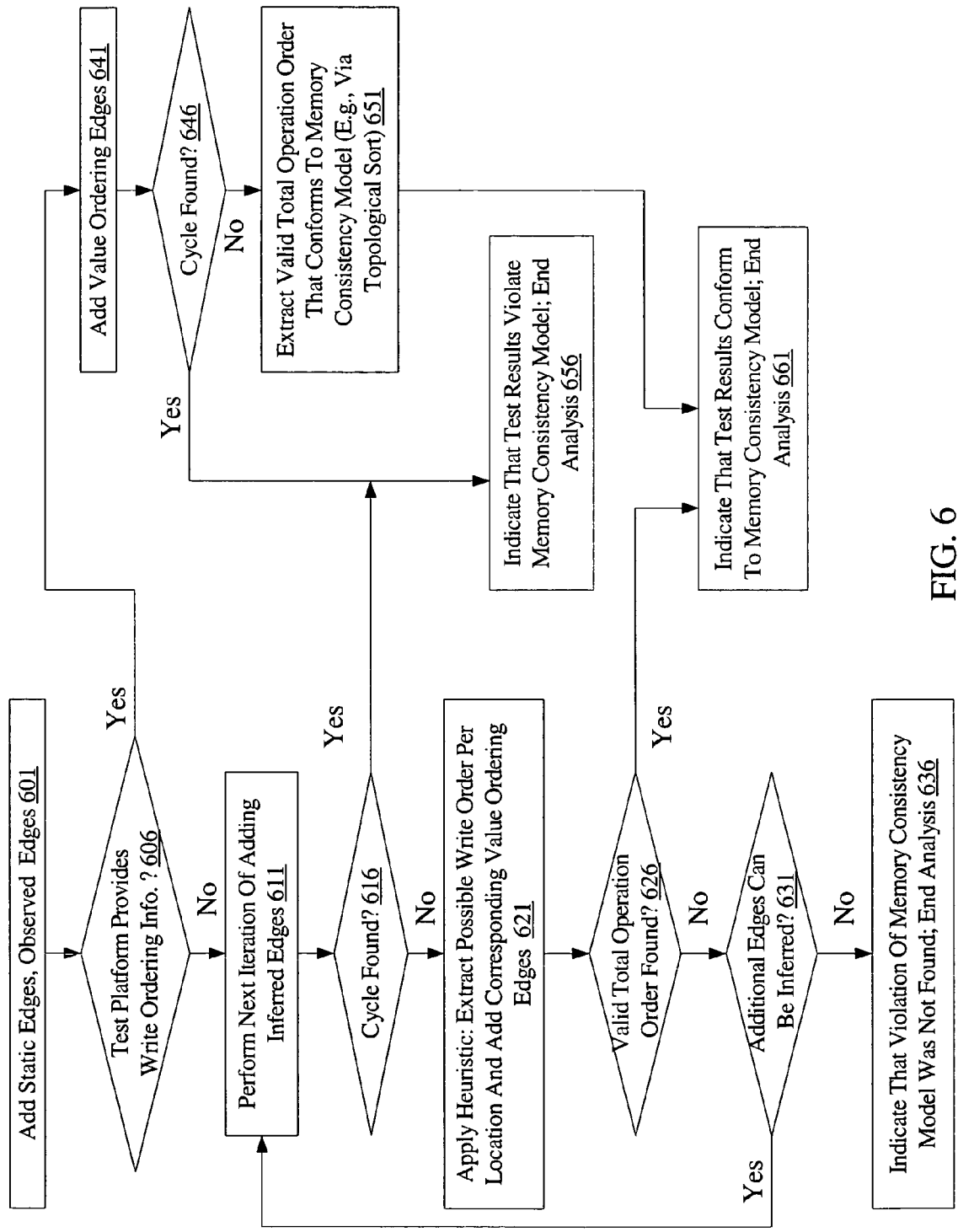
FIG. 6 is a flow diagram illustrating further aspects of the operation of an analysis module according to one embodiment, where the analysis module may be configured to apply a heuristic based on a possible write order.

FIG. 6 is a flow diagram illustrating further aspects of the operation of analysis module 120 according to one embodiment, where analysis module 120 may be configured to apply the heuristic based on a possible write order as described above. As described earlier, after representing the memory operations performed during the test program execution as the nodes of a directed graph, analysis module 120 may add static edges and observed edges to the graph (block 601 of FIG. 6). The static and observed edges may be added by applying rules A1-A5. If the test platform 130 provides write ordering information, as detected in decision block 606 of FIG. 6, analysis module 120 may perform VTSO-conflict analysis, e.g., by adding value ordering edges in accordance with rules A6 and A7 (block 641). If a cycle is found in the graph after the VTSO-conflict rules have been applied (as detected in block 646), analysis module 120 may indicate that the test results violate TSO and end analysis (block 656). If no cycle is found under the VTSO-conflict rules, analysis module 120 may extract a valid total operation order that conforms to TSO, e.g., via a topological sort of the graph (block 651). Analysis module 120 may then indicate that the execution results are valid under TSO (block 661) and terminate analysis.

If test platform 130 does not provide write ordering information, analysis module 120 may proceed to iteratively apply rules B6 and B7 for the VTSO-read problem. In the embodiment depicted in FIG. 6, after every full iteration of adding inferred edges according to rules B6 and B7 (block 611), analysis module 120 may check the graph for cycles (decision block 616). If a cycle is found, analysis module 120 may indicate that the test results violate TSO and terminate analysis (block 656). However, if no cycle is found, analysis module 120 may apply the heuristic described above (block 621). That is, analysis module 120 may extract a possible write order from the graph, e.g., via a topological sort, and add value ordering edges according to the VTSO-conflict rules A6 and A7. If, after adding the value ordering edges based on a possible write order, a valid total operating order is found (as detected in decision block 626), analysis module 120 may indicate that the results conform to TSO and terminate analysis (block 661). If a valid total operating order is not found, analysis module 120 may revert to the graph as it existed prior to the application of the heuristic and continue with VTSO-read analysis. For example, if additional edges can be inferred using rules B6 and B7 (as detected in decision block 631), analysis module 120 may iterate over the operations starting at block 611. If no additional edges can be added, analysis module 120 may indicate that no violation of TSO has been found and end analysis (block 636). As noted above, similar techniques and heuristics may be applied to verify compliance with memory consistency models other than TSO in some embodiments.

As described earlier, the addition of inferred edges in accordance with rules B6 and B7 may require several iterations of backward and forward traversals of the directed graph from multiple starting points (i.e., multiple load and store nodes) in some embodiments. During each iteration, new predecessor nodes for each load and new successors for each store may need to be found using the current set of edges in the graph. In one embodiment, analysis module 120 may be configured to use a technique based on vector clocks to reduce or limit the total number of graph edges traversed when applying rules B6 and B7. Pseudo-code including further details of how the number of traversed edges is limited, as well as an example of using the vector clock technique, is provided below. In analyzing the results of a multithreaded test execution, an array or vector of elements, which may be termed a vector clock, may be maintained by analysis module 120 for each node of the graph. Each element of the vector clock for a particular node M representing a memory operation at a processing element PE_k may identify a particular node R at one of the other processing elements, such that R occurs after node M in global order. In particular, in one embodiment, the first node at the other processing element (i.e., the earliest node in program order for the other processing element) that occurs after node M in global order (as known in the current analysis step) may be identified as node R. The vector clock at one or more nodes may be modified as the analysis progresses, inferred edges are added, and analysis module 120 modifies its knowledge of global order.

The vector clock based scheme used by analysis module 120 may rely on a property of the Sequential Consistency (SC) memory consistency model in some embodiments. In SC, program order implies global memory order. Thus, if a memory operation M1 at processing element PE_p precedes a memory operation M2 at processing element PE_q, all memory operations from PE_q after M2 in program order are also ordered after M1 in global memory order. Therefore, in adding inferred edges for a node representing M1 while verifying compliance with SC, analysis module 120 may only need to keep track of the earliest memory operation M2 in program order at each other processing element such that M1 precedes M2 in global memory order. For example, in applying rule B7, instead of traversing the whole graph to find all S' which succeed S in memory order, only the earliest such S' for each processing element may need to be considered. A vector clock for a given store node may identify such earliest S' nodes for each other node.

In applying a vector clock technique to TSO, however, differences between SC and TSO may need to be taken into account. In TSO, program order does not imply global memory order, as a load may bypass preceding stores. Nevertheless, program order among stores implies global memory order, and program order among loads also implies global memory order. Therefore, the stream of memory operations for a processing element may be split into a load stream and a store stream in one embodiment. Each stream may be considered to represent operations at a "virtual SC processing element" and may be termed a "virtual SC operation stream" herein. Vector clocks may be maintained for each node in the two streams to limit the edges traversed during each iteration of applying rules B6 and B7. It is noted that edges between loads and succeeding stores (in program order) may also be added when using the split streams; i.e., some edges may lead from one stream to the other.

Figure 7:
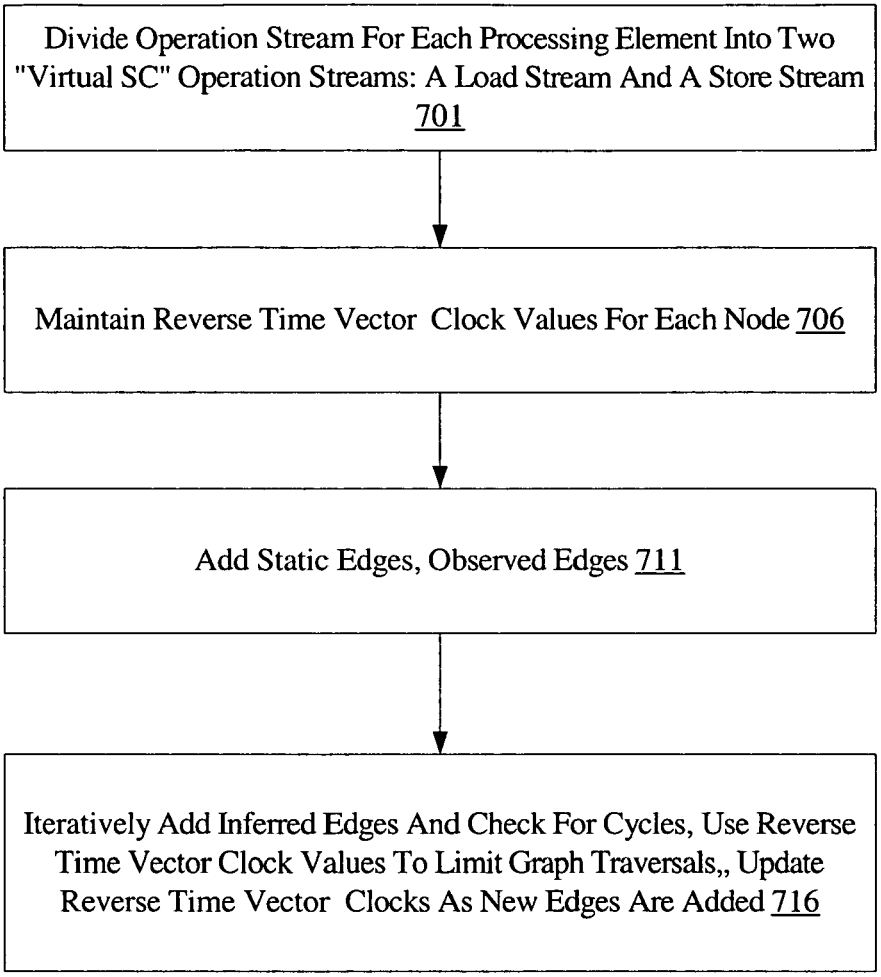
FIG. 7 is a flow diagram illustrating aspects of the operation of an analysis module according to one embodiment where vector clocks are employed.

FIG. 7 is a flow diagram illustrating aspects of the operation of analysis module 120 according to one embodiment where vector clocks are employed. Analysis module 120 may divide the memory operation sequence for each processing element into two virtual SC operation streams, a load stream and a store stream, as indicated in block 701. A reverse time vector clock may be maintained for each node in the two streams in one embodiment, where each reverse time vector clock includes an entry for each of the virtual SC processing element streams (block 706). (The phrase "reverse time" may be used because entries of the vector clock identify earliest nodes that a node precedes in global memory order at other processing elements, rather than latest nodes that precede the node; and a reverse topological sort of the graph may be used to populate the vector clock entries.) Thus, for example, in one embodiment, if the multithreaded test were executed on P processing elements, each node's reverse time vector clock contains (2*P) entries, one entry each for loads and stores for each processing element. Static and observed edges may be added by analysis module 120 in accordance with rules A1-A5 as described above (block 711). Analysis module 120 may add inferred edges iteratively and check for cycles, where the number of edge traversals may be limited or reduced using the reverse time vector clock entries (block 716), e.g., in accordance with the pseudo-code provided below. In addition, the values for the reverse time vector clocks may be updated for one or more nodes during each iteration. The use of vector clocks in this fashion may represent a tradeoff that may improve total analysis runtime at the cost of additional memory to store the vector clock values for each node.

The following high-level description and pseudo-code describes how the application of rules B6 and B7 may be modified in embodiments employing vector clocks. The notation x.RTVC[ ] represents a reverse time vector clock structure for a node x, and entry x.RTVC[j] represents the entry for processing element "j" within x.RTVC[ ].

```
// Input: Two virtual SC operation streams for each processing element,
// one consisting of only loads and one consisting of only stores; and a
// function w that maps a load to the store which created its value
// Data Structure: A reverse time vector clock (RTVC[ ]) at each node x of
// the virtual SC operation streams; x.RTVC[j] points to the first node
// in the virtual SC operation stream j such that
// x precedes x.RTVC[j] in global memory order. RTVC[ ] for each node
// is computed using reverse topological sort.
// Add inferred edges iteratively (rules B6 and B7)
do
    for each store S
        for each virtual SC operation stream j
            x = S.RTVC[j];
            if (x is a load) then
                find L, the first load that accesses same location as S,
                    where x.pro.L and w(L) differs from S;
            // Apply rule B6
                add edge from S to w(L) if S.glo.(w(L)) is not already
                    true;
                update S.RTVC[ ];
            else // x is a store
                find S', the first store that accesses same location as S,
```

```
            where x.pro.S';
        // Apply rule B7
        for all loads L such that w(L) = S
            add edge from L to S' if L.glo.S' is not already
                true;
            update L.RTVC[ ];
        end for
    end if
 end for
end for
until no more edges can be added.
```

Figure 8A:
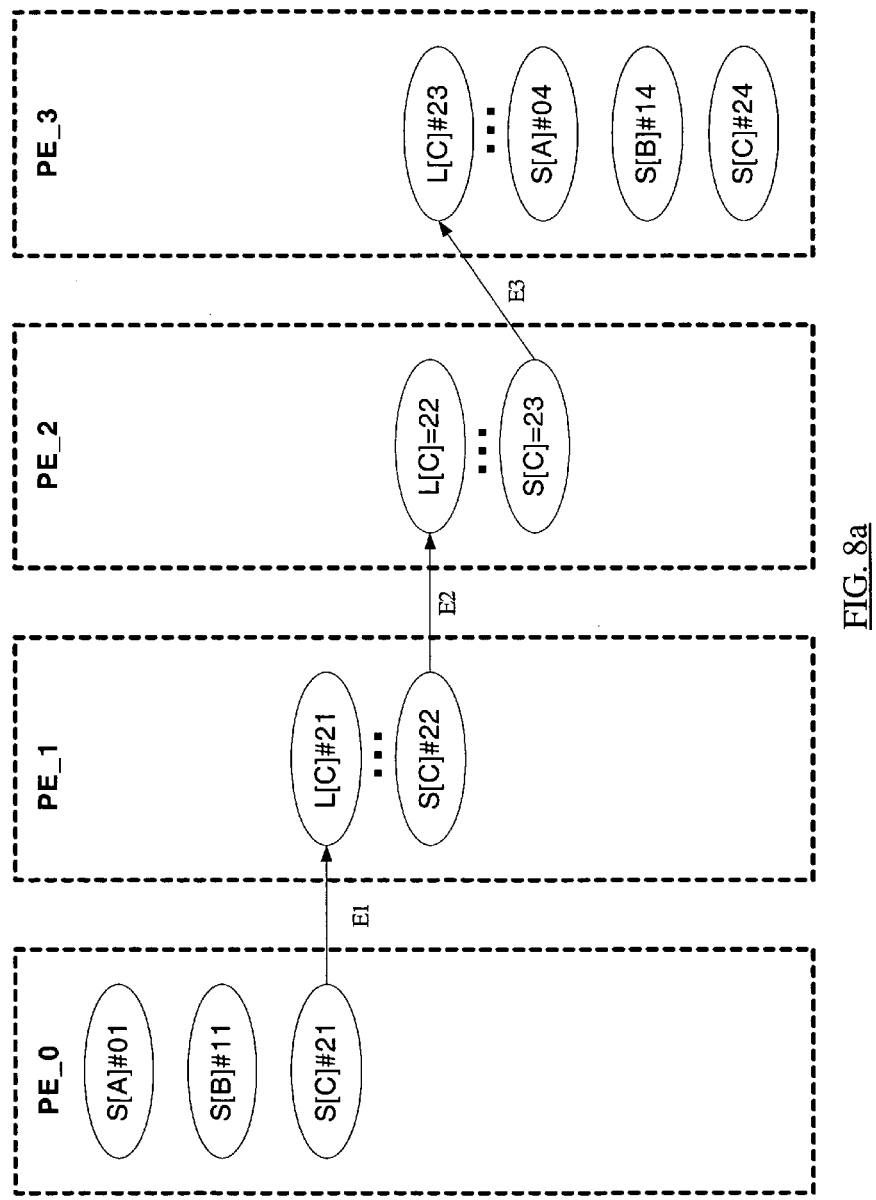
FIG. 8a illustrates an example of a directed graph representing a subset of memory operations performed during an execution of a multithreaded test run on four processing elements, according to one embodiment where a vector clock technique may be employed.

FIG. 8a illustrates an example of a directed graph representing a subset of memory operations performed during an execution of a multithreaded test run on four processing elements, according to one embodiment where the vector clock technique described above may be employed. Edges E1, E2 and E3 may have been added to the graph during earlier phases of the analysis. The graph may also contain other edges and nodes that are not shown in FIG. 8a. In the original VTSO-read algorithm (i.e., where vector clocks are not employed), the graph illustrated in FIG. 8a may have to be recursively traversed several times starting from the nodes for PE_0. Each traversal may lead analysis module 120 to discover that "S[A]#01" precedes "S[A]#04" in global memory order, "S[B]#11" precedes "S[B]#14", and "S[C]#21" precedes "S[C]#24", so that rule B7 may be applied.

Figure 8B:
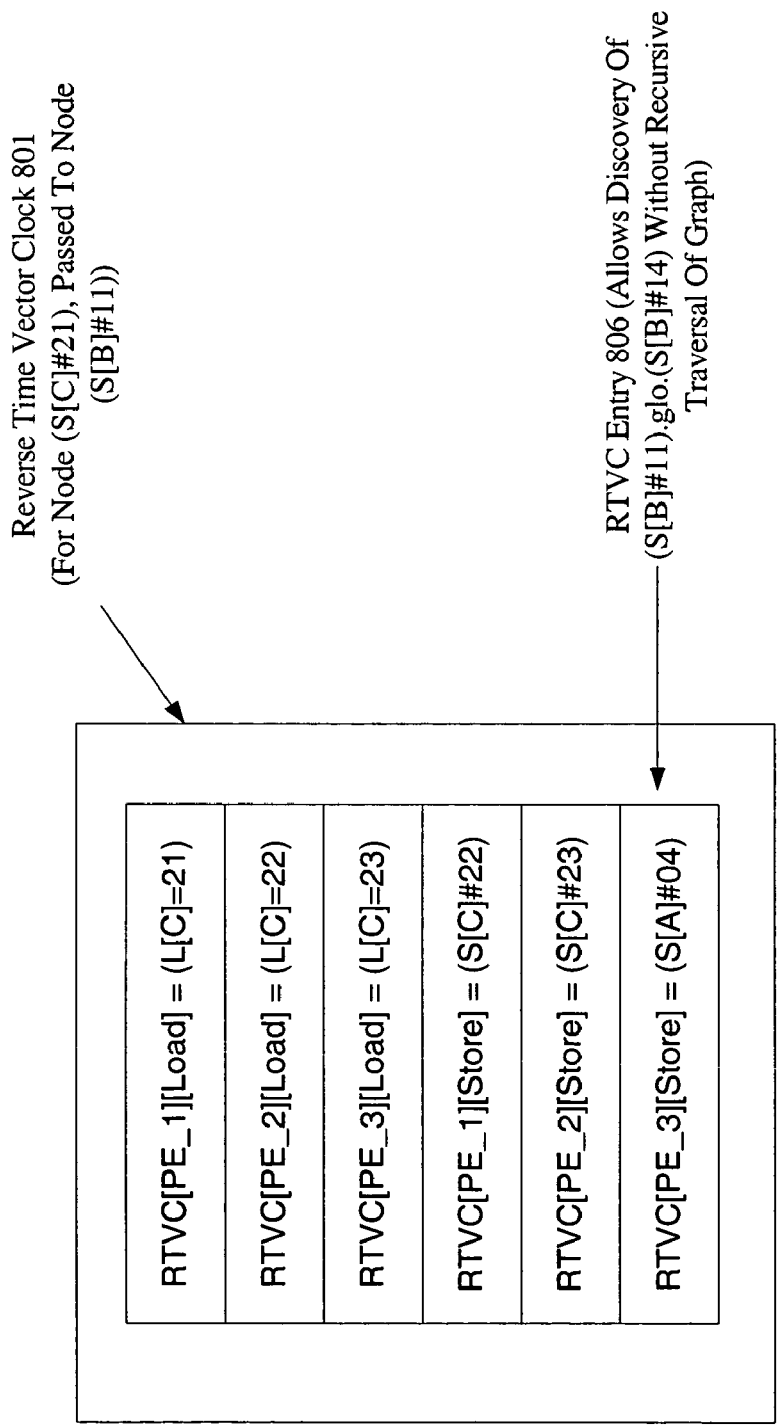
FIG. 8b illustrates entries of a reverse time vector clock (RTVC) structure that may be computed for a node, according to one embodiment.

If a vector clock technique is used instead, as described earlier, the operation streams for each processing element may first be divided into two virtual SC operation streams, one consisting of stores alone and one consisting of loads alone. A reverse topological sort starting from node "S[C]#24" may be performed to calculate the RTVC[ ] values for each node. FIG. 8b illustrates the entries of reverse time vector clock (RTVC) 801 that may be computed for node "S[C]#21", according to one embodiment. As shown, the RTVC entries include three entries for loads, and three entries for stores, corresponding to a total of three other processing elements or six "virtual SC processing elements". As shown, the load RTVC entries indicate that the first load that follows "S[C]#21" at PE_1 is "L[C]=21", at PE_2 is "L[C]=22", and at PE_3 is "L[C]=23". In addition, the store RTVC entries indicate that the first store that follows "S[C]#21" at PE_1 is "S[C]#22", at PE_2 is "S[C]#23", and at PE_3 is "S[A]#04".

In some embodiments, analysis module 120 may also be configured to implement a function or method that returns the next operation in program order that accesses a particular address after a given operation. For example, a function called get_next_in_thread_by_address(origin_node, address) may be provided in one implementation. Such a function, along with RTVC entries passed from other nodes during the reverse topological sort, may be used to quickly identify target nodes for adding inferred edges based on applying rules B6 and B7. For example, in FIG. 8a, the RTVC entry for "S[C]#21" may be passed to "S[B]#11" in the next step of the reverse topological sort. Analysis module 120 may use the RTVC store entry for PE_3 to identify the node "S[A]#04" as the earliest store node at PE_3 that follows "S[B]#11" in global order, without traversing edges between PE_0 and PE_3 via PE_1 and PE_2. Using a function call such as get_next_in_thread_by_address("S[A]#4",B), analysis module may efficiently discover that "S[B]#14" is the first store at PE_3 that modifies location B, and may proceed to apply rule B7, also without having to traverse edges leading from PE_0 to PE_3 via PE_1 and PE_2. In this way, the total number of edge traversals required to apply rules B6 and B7, and therefore the total time taken for the verification of compliance with the TSO memory model, may be reduced. It is noted that the complexity of the vector clocks-based graphical analysis algorithm for VTSO-read may be shown to of a much lower order than the complexity of the basic VTSO-read algorithm that does not use vector clocks.

In one embodiment, analysis module 120 may be configured to use the vector clock technique described above, as well as the heuristic based on possible write order described earlier, when analyzing a VTSO-read test execution (i.e., when test platform 130 does not provide global write ordering information). Thus, for example, in such an embodiment, analysis module 120 may be configured to first detect whether the test execution to be analyzed corresponds to a VTSO-read problem or a VTSO-conflict problem. In some embodiments, analysis module 120 may provide an interface allowing test module 110 or a user to specify which algorithm to use, while in other embodiments, analysis module 120 may be configured to select the algorithm automatically based on the contents of the test results. If the test results represent a VTSO-conflict problem, analysis module 120 may proceed to use rules A1-A7 to verify TSO compliance. If the test results represent a VTSO-conflict problem, analysis module 120 may proceed to use rules A1-A5 and B6-B7, optionally in conjunction with the vector clock-based algorithm described above, and/or in conjunction with the heuristics based on possible write orders.

As noted earlier, the techniques of using vector clocks and heuristics based on possible write orders may be used, with minor modifications in some cases, for verifying a variety of memory consistency models in different embodiments. For example, to verify compliance with SC, the rules A1-A5 and B6-B7 may also be applied, in addition to adding edges based on the SC ordering rule between stores and loads on the same processing element. Thus, the initial set of edges determined from per-processing element program order may be slightly different for SC, but the application of the remaining rules may be unchanged. For more relaxed memory consistency models, more than two virtual SC processing elements may be used for one original memory operation stream. For example, in one embodiment, for verifying compliance with the Relaxed Memory Order (RMO) model, the number of virtual SC processing elements may depend on the number of shared memory locations accessed by the test program.

Figure 9:
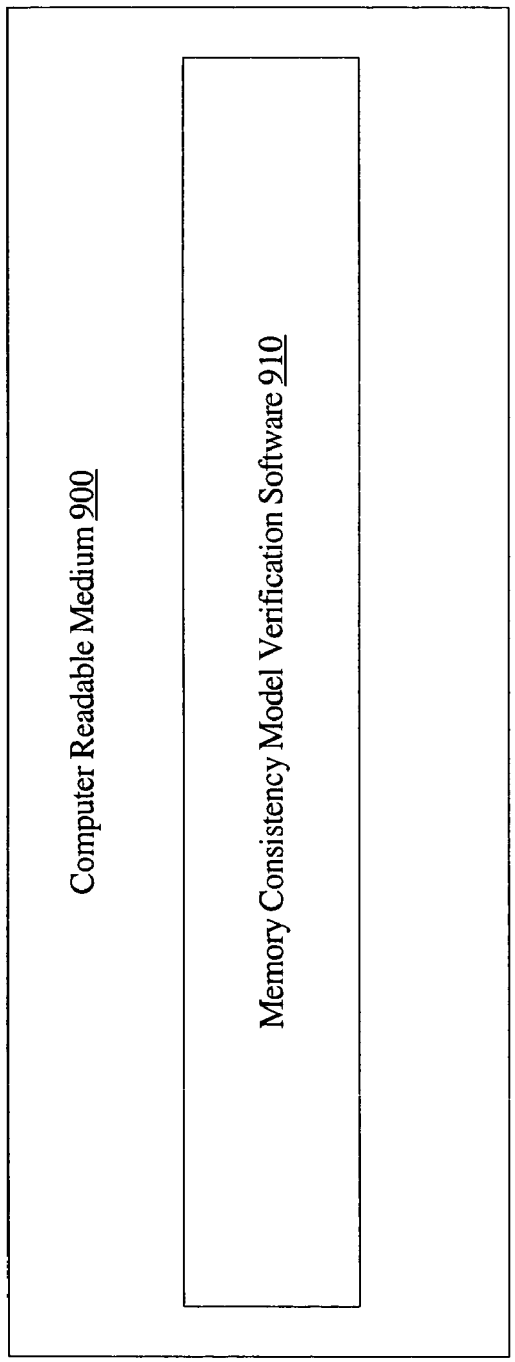
FIG. 9 is a block diagram of one embodiment of a computer readable medium.

FIG. 9 is a block diagram of one embodiment of a computer readable medium 900, comprising memory model consistency verification software 910 including instructions which, when executed, implement the functionality of test module 110 and analysis module 120 described above. Various components of the test module 110 (e.g., test generator 112 and execution coordinator 114) and/or analysis module 120 may be packaged together as a single software program, or packaged in any combination in different embodiments. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. It is noted that portions or all of test module 110 and/or analysis module 120 may be implemented in hardware and/or firmware in some embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a computer;
   a computer accessible storage medium storing program instructions executable to implement a test module and an analysis module;
   wherein the instructions executable to implement the test module include instructions executable to coordinate an execution of a multithreaded test program on a test platform including a plurality of processing elements; and
   wherein the instructions executable to implement the analysis module include instructions executable to:
      automatically represent memory operations performed during execution of the multithreaded test program using a directed graph, wherein each node of the directed graph represents a memory operation performed by one of the plurality of processing elements, wherein representing memory operations performed during execution of the multithreaded test program includes adding edges to the directed graph, wherein a given node of the directed graph includes a vector clock data structure, wherein the vector clock data structure for the given node is configured to store information specifying an edge for each of the other ones of the plurality of processing elements, wherein each specified edge for the given node indicates the earliest node in the directed graph that follows the given node in a global memory order, but does not indicate other nodes; and
      automatically determine whether results of the execution of the multithreaded test program violate a memory consistency model by determining whether a cycle is found in the directed graph, wherein said determining whether the cycle is found includes traversing edges in the directed graph, wherein said traversing includes using one or more vector clock data structures for one or more corresponding nodes, wherein use of the one or more vector clock data structures reduces a number of edges to be traversed.

2. The system as recited in claim 1, wherein the global memory order is split into two streams, the first of which represents stores to memory and the second of which represents loads from memory, wherein each node in the directed graph belongs to one of the two streams.

3. The system as recited in claim 1, wherein, if the test platform does not provide an indication of an order in which writes from multiple processing elements of the plurality of processing elements are performed at a shared memory location during the execution, the instructions executable to implement the analysis module are further executable to:
   use a heuristic based on a possible write order at each shared memory location of a plurality of shared memory locations to determine whether the results correspond to a valid ordering of events according to the memory consistency model.

4. The system as recited in claim 1, wherein the test platform includes a simulation model of a multiprocessor system.

5. The system as recited in claim 1, wherein the test platform includes a multiprocessor system.

6. The system as recited in claim 1, wherein the instructions executable to implement the test module include instructions executable to generate the multithreaded test program.

7. The system as recited in claim 6, wherein the instructions executable to implement the test module include instructions executable to include a mix of instructions in the multithreaded test programs in accordance with user-specified input parameters.

8. The system as recited in claim 1, wherein each write operation included in the multithreaded test program writes a distinctly identifiable value.

9. A method, comprising executing instructions on a computer, wherein the instructions are stored on a computer accessible storage medium and are executable by the computer to perform:
   coordinating an execution of a multithreaded test program on a test platform including a plurality of processing elements;
   automatically representing memory operations performed during execution of the multithreaded test program using a directed graph, wherein each node of the directed graph represents a memory operation performed by one of the plurality of processing elements, wherein representing memory operations performed during execution of the multithreaded test program includes adding edges to the directed graph, wherein a given node of the directed graph includes a vector clock data structure, wherein the vector clock data structure for the given node is configured to store information specifying an edge for each of the other ones of the plurality of processing elements, and wherein each specified edge for the given node indicates the earliest node in the directed graph that follows the given node in a global memory order, but does not indicate other nodes; and
   automatically verifying that the results of the execution correspond to a valid ordering of events according to a memory consistency model, wherein verifying the results includes traversing edges in the directed graph, wherein said traversing includes using one or more vector clock data structures for one or more corresponding nodes, wherein the use of the one or more vector clock data structures reduces a number of edges to be traversed in order to verify the results of the execution.

10. The method as recited in claim 9, wherein the global memory order is split into two streams, the first of which represents stores to memory and the second of which represents loads from memory, wherein each node in the directed graph belongs to one of the two streams.

11. The method as recited in claim 9, further comprising:
    in response to the test platform not providing an indication of an order in which writes from multiple processing elements of the plurality of processing elements are performed at a shared memory location during the execution, using a heuristic based on a possible write order at each shared memory location of a plurality of shared memory locations to determine whether the results correspond to a valid ordering of events according to the memory consistency model.

12. A computer readable storage medium comprising software instructions, wherein the software instructions are executable to:
    coordinate an execution of a multithreaded test program on a test platform including a plurality of processing elements;

automatically represent memory operations performed during execution of the multithreaded test program using a directed graph, wherein each node of the directed graph represents a memory operation performed by one of the plurality of processing elements, wherein representing memory operations performed during execution of the multithreaded test program includes adding edges to the directed graph, wherein a given node of the directed graph includes a vector clock data structure, wherein the vector clock data structure for the given node is configured to store information specifying an edge for each of the other ones of the plurality of processing elements, wherein each specified edge for the given node indicates only the earliest node in the directed graph that follows the given node in a global memory order;

automatically detect that results of the execution of the multithreaded test program violate one or more axioms of a memory consistency model in response to a cycle being found in the directed graph, wherein detection of the results includes traversing edges in the directed graph, wherein said traversing includes using one or more vector clock data structures for one or more corresponding nodes, wherein use of the one or more vector clock data structures reduces a number of edges to be traversed.

13. The computer readable storage medium as recited in claim 12, wherein the global memory order is split into two streams, the first of which represents stores to memory and the second of which represents loads from memory, wherein each node in the directed graph belongs to one of the two streams.

14. The computer readable storage medium as recited in claim 12, wherein the instructions are further executable to:
 in response to the test platform not providing an indication of the order, use a heuristic based on a possible write order at each shared memory location of a plurality of shared memory locations to determine whether the results correspond to a valid ordering of events according to the memory consistency model.

* * * * *